(12) United States Patent
D'Andrea et al.

(10) Patent No.: US 8,170,711 B2
(45) Date of Patent: May 1, 2012

(54) METHOD AND SYSTEM FOR TRANSPORTING INVENTORY ITEMS

(75) Inventors: Raffaello D'Andrea, Ithaca, NY (US); Peter K. Mansfield, Bellevue, WA (US); Michael C. Mountz, Cambridge, MA (US); Dennis Polic, Medford, MA (US); Patrick R. Dingle, Salem, MA (US)

(73) Assignee: Kiva Systems, Inc., North Reading, MA (US)

( * ) Notice: Subject to any disclaimer, the term of this patent is extended or adjusted under 35 U.S.C. 154(b) by 0 days.

(21) Appl. No.: 13/016,046

(22) Filed: Jan. 28, 2011

(65) Prior Publication Data
US 2011/0125312 A1 May 26, 2011

Related U.S. Application Data

(62) Division of application No. 12/890,197, filed on Sep. 24, 2010, which is a division of application No. 11/423,294, filed on Jun. 9, 2006, now Pat. No. 7,826,919.

(51) Int. Cl.
*G06F 7/00* (2006.01)
*G01C 21/00* (2006.01)
*G06F 17/00* (2006.01)
*B25J 1/00* (2006.01)

(52) U.S. Cl. ........ 700/214; 700/228; 700/213; 700/215; 701/19; 701/11; 414/1

(58) Field of Classification Search .................. None
See application file for complete search history.

(56) References Cited

U.S. PATENT DOCUMENTS
4,972,917 A * 11/1990 Matsumoto et al. .......... 180/168
(Continued)

FOREIGN PATENT DOCUMENTS
EP 0 244 984 A2 11/1987
FR 2 689 488 A1 4/1992
WO WO 2006/441808 A2 4/2006

OTHER PUBLICATIONS

PCT Notification of Transmittal of the International Search Report and the Written Opinion of the International Searching Authority, or the Declaration, with attached International Search Report and the Written Opinion of the International Searching Authority in International Application No. PCT/US2007/011302, dated Nov. 7, 2008, 12 pages.

(Continued)

*Primary Examiner* — Gene Crawford
*Assistant Examiner* — Yolanda Cumbess
(74) *Attorney, Agent, or Firm* — Baker Botts L.L.P.

(57) ABSTRACT

A system for transporting inventory items includes an inventory holder capable of storing inventory items and a mobile drive unit. The mobile drive unit is capable of moving to a first point with the inventory holder at least one of coupled to and supported by the mobile drive unit. The mobile drive unit is additionally capable of determining a location of the inventory holder and calculating a difference between the location of the inventory holder and the first point. The mobile drive unit is then capable of determining whether the difference is greater than a predetermined tolerance. In response to determining that the difference is greater than the predetermined tolerance, the mobile drive unit is also capable of moving to a second point based on the location of the inventory holder, docking with the inventory holder, and moving the mobile drive unit and the inventory holder to the first point.

20 Claims, 10 Drawing Sheets

U.S. PATENT DOCUMENTS

| | | | | |
|---|---|---|---|---|
| 5,658,120 | A | * | 8/1997 | Watanabe .................... 414/495 |
| 5,993,045 | A | * | 11/1999 | Schmidtke et al. ........... 700/214 |
| 6,823,236 | B2 | * | 11/2004 | Speckhart et al. ............ 700/215 |
| 2004/0010337 | A1 | * | 1/2004 | Mountz ........................ 700/214 |

OTHER PUBLICATIONS

Canadian Patent Office Official Action in Canadian Patent Application No. 2,652,114, dated Nov. 5, 2009, 4 pages.

* cited by examiner

METHOD AND SYSTEM FOR TRANSPORTING INVENTORY ITEMS

CROSS-REFERENCE TO RELATED APPLICATION

This application is a divisional of U.S. application Ser. No. 12/890,197 filed Sep. 24, 2010 and entitled "Method and System for Transporting Inventory Items" which is a divisional application of U.S. application Ser. No. 11/423,294 filed Jun. 9, 2006 and entitled "Method and System for Transporting Inventory Items", now U.S. Pat. No. 7,826,919.

TECHNICAL FIELD OF THE INVENTION

This invention relates in general to inventory systems, and more particularly, to a method and system for transporting inventory items within an inventory system.

BACKGROUND OF THE INVENTION

Modern inventory systems, such as those in mail-order and e-commerce warehouses, airport luggage systems, and custom-order manufacturing facilities, face significant challenges in providing fast, accurate responses to requests for inventory items. In recent years, automation has improved the speed and efficiency of storing and retrieving inventory items within such systems. However, automated systems can be extremely vulnerable to operational errors. In particular, when components within an automated system deviate from their anticipated operation, errors may be introduced. Correcting such errors may require manual intervention on the part of a human operator, thereby limiting the benefits of automation.

SUMMARY OF THE INVENTION

In accordance with the present invention, the disadvantages and problems associated with inventory systems have been substantially reduced or eliminated. In particular, a mobile inventory system is provided that supports techniques for automatic correction of particular types of operational errors.

In accordance with one embodiment of the present invention, a system for transporting inventory items includes an inventory holder and a mobile drive unit. The inventory holder is capable of storing inventory items. The mobile drive unit is capable of moving to a first point with the inventory holder at least one of coupled to and supported by the mobile drive unit. The mobile drive unit is additionally capable of determining a location of the inventory holder and calculating a difference between the location of the inventory holder and the first point. The mobile drive unit is then capable of determining whether the difference is greater than a predetermined tolerance. In response to determining that the difference is greater than the predetermined tolerance, the mobile drive unit is also capable of moving to a second point, docking with the inventory holder, and moving the mobile drive unit and the inventory holder to the first point.

In accordance with another embodiment of the present invention, a method for transporting inventory items includes moving a mobile drive unit to a first point while an inventory holder is at least one of coupled to and supported by the mobile drive unit. Additionally, the method includes determining a location of the inventory holder and calculating a difference between the location of the inventory holder and the first point. The method also includes then determining whether the difference is greater than a predetermined tolerance. In response to determining that the difference is greater than the predetermined tolerance, the method further includes moving the mobile drive unit to a second point, docking the mobile drive unit with the inventory holder, and moving the mobile drive unit and the inventory holder to the first point.

Technical advantages of certain embodiments of the present invention include an inventory management system that is easily scalable, that can be easily adjusted to manage inventory items of varying types, sizes and shapes, and that can be operated with minimal human intervention. Additionally, particular embodiments of the present invention may support automated verification and correction of the placement of inventory holders by mobile drive units and/or other navigational features that limit the number of errors introduced by the operation of the mobile drive units.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
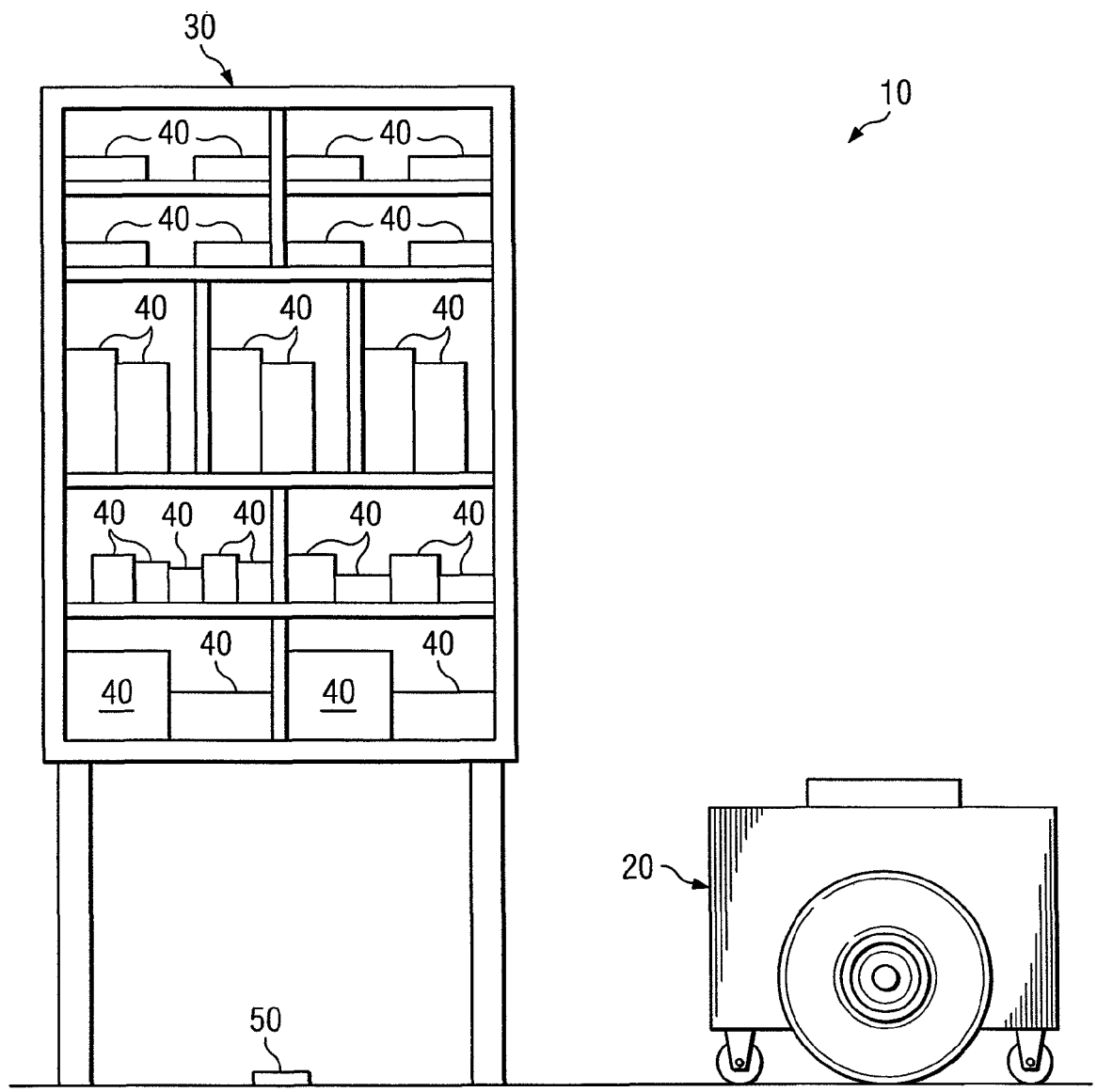
FIG. 1 illustrates an inventory storage system according to a particular embodiment.

FIG. 1 illustrates an inventory system 10 for storing, sorting, and retrieving inventory items 40 that includes a mobile drive unit 20 and an inventory holder 30. Inventory holder 30 stores multiple inventory items 40 of various item types. Mobile drive unit 20 moves inventory holder 30 between designated points within a workspace associated with inventory system 10.

Mobile drive unit 20 is capable of moving within the workspace and may include any appropriate components for propelling itself and navigating to a particular destination within the workspace. Additionally, mobile drive unit 20 may dock with inventory holder 30 in any appropriate manner so that inventory holder 30 is coupled to and/or supported by mobile drive unit 20 when mobile drive unit 20 is docked with inventory holder 30. When docked to inventory holder 30, mobile drive unit 20 is also capable of propelling and/or otherwise moving inventory holder 30. Mobile drive unit 20 may include any appropriate components for docking with inventory holder 30 and for maneuvering inventory holder 30 while inventory holder 30 is docked with mobile drive unit 20. The components of a particular embodiment of mobile drive unit 20 are described in greater detail below with respect to FIGS. 2A and 2B. Although FIG. 1 shows, for the sake of simplicity, only a single mobile drive unit 20, inventory system 10 may include any appropriate number of mobile drive units. As a result, mobile drive unit 20 may represent one of several mobile drive units 20 moving inventory holders 30 in inventory system 10.

Inventory holder 30 stores inventory items 40. In particular embodiments, inventory holder 30 includes multiple storage bins with each storage bin capable of holding inventory items 40. Additionally, in particular embodiments, inventory items 40 may also hang from hooks or bars within or on inventory holder 30. In general, inventory holder 30 may store inventory items 40 in any appropriate manner within inventory holder 30 and/or on the external surface of inventory holder 30. Inventory holder 30 is capable of being rolled, carried, or otherwise moved by mobile drive unit 20. The components of a particular embodiment of inventory holder 30 are described in greater detail below with respect to FIG. 3. Although FIG. 1 shows, for the sake of simplicity, only a single inventory holder 30, inventory system 10 may include any appropriate number of inventory holders. As a result, inventory holder 30 may represent one of several inventory holders 30 storing inventory items 40 in inventory system 10.

Inventory items 40 represent any items, material, or animate or inanimate objects suitable for storage, retrieval, delivery, sortation, and/or routing in an automated inventory, warehouse, manufacturing, and/or parts-handling system. As one example, inventory items 40 may represent items of merchandise stored in a warehouse. Mobile drive unit 20 may retrieve a specified inventory holder 30 containing particular inventory items 40 associated with a customer order to be packed for delivery to a customer or other party.

As another example, inventory items 40 may represent luggage stored in a luggage facility of an airport. Mobile drive unit 20 may retrieve inventory holder 30 containing luggage to be transported, tracked, and/or otherwise processed according to particular policies. This may include selecting particular items of luggage for explosives screening, moving items of luggage associated with a flight that has switched gates, or removing luggage items belonging to passengers who have missed the flight.

As yet another example, inventory items 40 may represent individual components of a manufacturing kit. More specifically, the components may represent components intended for inclusion in an assembled product, such as computer components for a customized computer system. In such an embodiment, mobile drive unit 20 may retrieve particular components identified by a specification associated with a customer order.

As yet another example, inventory items 40 may represent people. For example, in a hospital setting, inventory items 40 may represent beds containing particular patients. Thus, inventory system 10 may be configured to provide a safe, effective system for moving hospital beds that limits the potential for injury to patients and reduces the possibility of mistakes arising from human error. In general, however, inventory items 40 may be any suitable items appropriate for storage in any appropriate form of inventory holder 30, as described below.

In operation, mobile drive unit 20 is capable of moving between points within a workspace associated with inventory system 10 and, when coupled to inventory holder 30, of transporting inventory holder 30 between locations within the workspace. Mobile drive unit 20 may determine the movement of mobile drive unit 20 autonomously and/or based on commands received by mobile drive unit 20. For example, in particular embodiments, mobile drive unit 20 may receive information that identifies destinations for mobile drive unit 20 from a management device of inventory system 10, from an operator of inventory system 10, or any other suitable party or device. Mobile drive unit 20 may receive the information through a wireless interface, over a wired connection, or using any other suitable components to communicate with an operator or management device of inventory system 10. In general, however, movement of mobile drive unit 20 may, depending on the configuration of mobile drive unit 20 and inventory system 10, be controlled, in whole or in part, by mobile drive unit 20, or any appropriate external devices or parties.

For the sake of simplicity, however, the remainder of this description assumes that mobile drive unit 20 wirelessly receives orders, data, instructions, commands, or information structured in any other appropriate form, referred to here as a "command" or "commands," from a remote component of inventory system 10. These commands identify a particular inventory holder 30 to be moved by mobile drive unit 20 and/or a current location for that inventory holder 30, and a destination for that inventory holder 30. Mobile drive unit 20 then controls operation of motors, wheels, and/or other components of mobile drive unit 20 to move mobile drive unit 20 and/or inventory holder 30.

In response to receiving such a command, mobile drive unit 20 moves to a storage location identified by the command. Mobile drive unit 20 may then dock with identified inventory holder 30. Mobile drive unit 20 may dock with inventory holder 30 in any appropriate manner so that inventory holder 30 is coupled to and/or supported by mobile drive unit 20 when mobile drive unit 20 is docked with inventory holder 30. For example, in particular embodiments, mobile drive unit 20 docks with inventory holder 30 by positioning itself beneath inventory holder 30 and raising a docking head of mobile drive unit 20 until the docking head lifts inventory holder 30 off the ground. As a result, in such embodiments, mobile drive unit 20 may support all or a portion of the weight of inventory holder 30 when mobile drive unit 20 is docked with inventory holder 30. Additionally, in particular embodiments, one or more components of mobile drive unit 20 may grasp, connect to, interlock with, or otherwise interact with one or more components of inventory holder 30 to form a physical coupling between mobile drive unit 20 and inventory holder 30. For example, in particular embodiments, a docking head of mobile drive unit 20 may include one or more spines that fit within apertures of inventory holder 30 when mobile drive unit 20 docks with inventory holder 30, allowing mobile drive unit 20 to maneuver inventory holder 30 by applying force to inventory holder 30.

After docking with inventory holder 30, mobile drive unit 20 may move inventory holder 30 to a second location, such as an inventory station, where appropriate inventory items 40 may be selected from inventory holder 30 and packed for shipping or where inventory items 40 may be added to inventory holder 30 to replenish the supply of inventory items 40 available in inventory system 10. In a particular embodiment, mobile drive unit 20 may provide sufficient power to propel both mobile drive unit 20 and inventory holder 30. In alternative embodiments, inventory holder 30 may provide additional power, such as through the operation of motorized wheels on inventory holder 30, to assist mobile drive unit 20 in propelling inventory holder 30 to the second location.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks 50. Mobile drive unit 20 may be configured to detect fiducial marks 50 and to determine the location of mobile drive unit 20 and/or measure its movement based on the detection of fiducial marks 50.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 40. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

Because inventory system 10, in particular embodiments, is at least partially automated, it may be desirable for the location of inventory holder 30 to be precisely controlled so that mobile drive units 20 can properly locate and interact with inventory holders 30. As used in this description and the claims that follow, unless otherwise indicated the "location" of an inventory holder 30 or mobile drive unit 20 may represent an absolute or relative measurement of the location, position, and/or orientation of the relevant device. As a result, before undocking from inventory holder 30, mobile drive unit 20 may attempt to align itself with a reference point within the workspace so that inventory holder 30 will be properly situated for subsequent transportation and/or to prevent collision with other devices moving within the workspace. For example, mobile drive unit 20 may attempt to align itself with a particular fiducial mark 50 before undocking from inventory holder 30.

While mobile drive unit 20 is transporting inventory holder 30, however, the location of inventory holder 30 relative to mobile drive unit 20 may shift slightly. This shifting may occur as the result of slippage between docking surfaces of mobile drive unit 20 and inventory holder 30, vibration during transport, or any other incident that may alter the location of inventory holder 30 relative to mobile drive unit 20. As a result of this slippage, mobile drive unit's attempt to align itself with an appropriate reference point before undocking may not be sufficient to ensure that inventory holder is properly aligned with that reference point after undocking.

Figure 5:
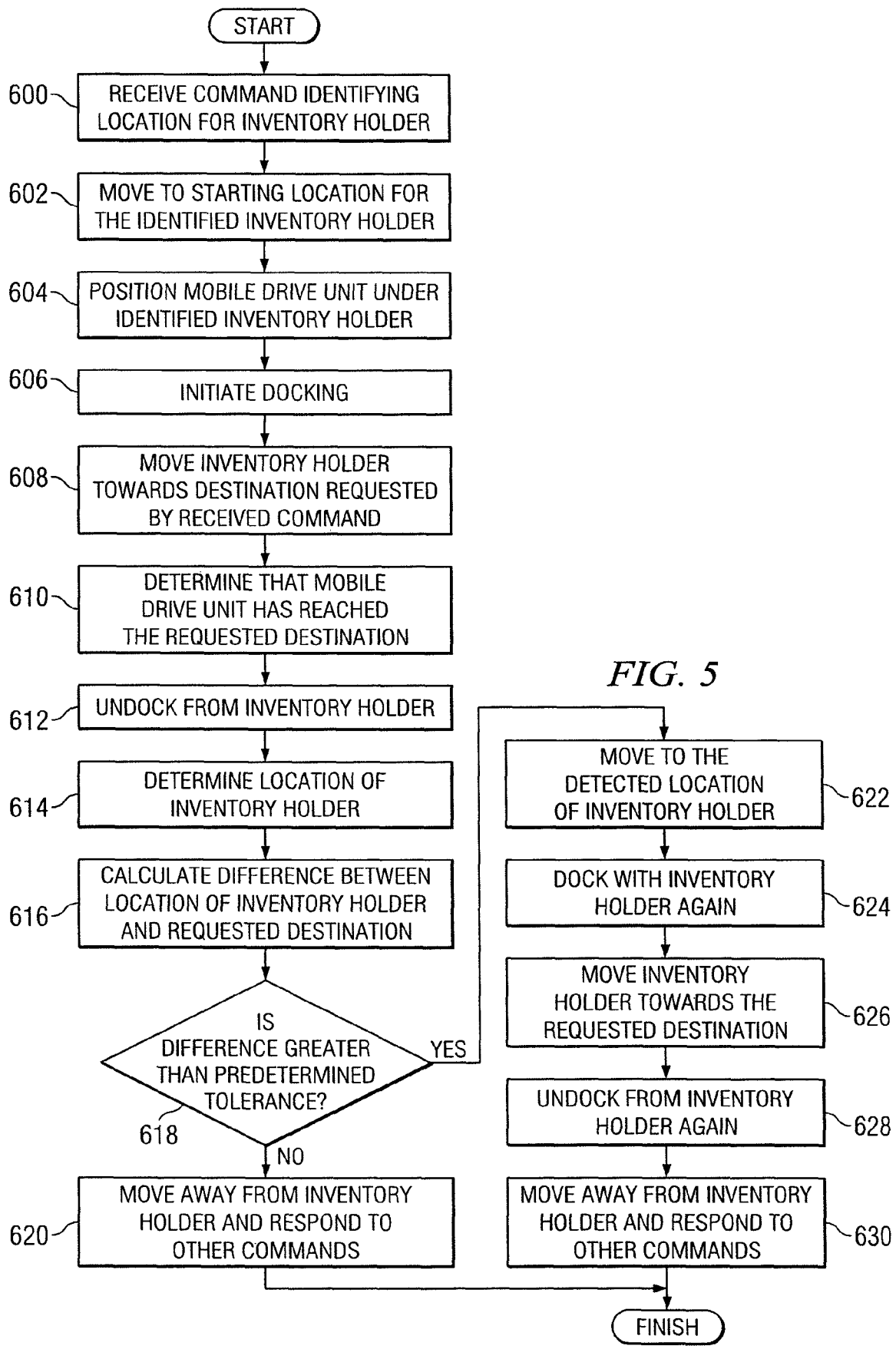
FIG. 5 is a flowchart illustrating certain aspects of the operation of particular embodiments of mobile drive unit.
Figure 6:
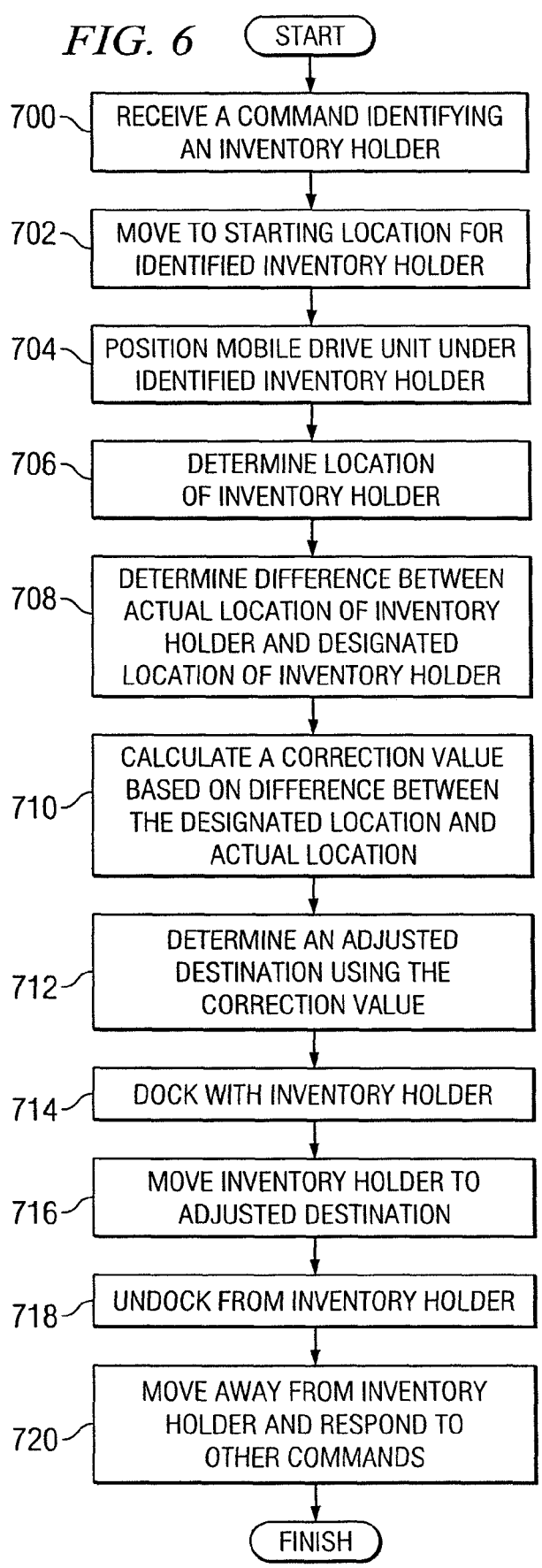
FIG. 6 is a flowchart illustrating other aspects of the operation of particular embodiments of mobile drive unit.

Consequently, in particular embodiments, mobile drive unit 20 may be configured to perform certain operations, as described in greater detail below, to detect and correct misalignments of an inventory holder 30 after that inventory holder 30 has been moved within the workspace. More specifically, in particular embodiments, mobile drive unit 20 may determine the difference between the location of a particular inventory holder 30 and an anticipated, intended, and/or requested location of the inventory holder 30. Mobile drive unit 20 may then take certain actions to reduce or eliminate this deviation, immediately following undocking from inventory holder 30, prior to a subsequent docking with inventory holder 30, or at any other appropriate time during the course of operation. FIGS. 4A-4H illustrate operation of a particular embodiment of mobile drive unit 20 in correcting a misalignment of inventory holder 30. Additionally, FIGS. 5 and 6 are flowcharts describing the operation of particular embodiments of mobile drive unit 20 in correcting misalignments in inventory holder 30.

The implementation of such correction techniques may, in particular embodiments, allow greater precision in the placement of inventory holders 30 and facilitate a greater degree of automation in inventory system 10. Additionally, in particular embodiments, implementation of such techniques may also reduce operational errors in inventory system 10, permit the use of a smaller workspace, and/or prevent improperly positioned inventory holders 30 from being damaged by mobile drive units 20 and other components moving in the workspace of inventory system 10. As a result, particular embodiments of mobile drive unit 20 may provide multiple benefits. Nonetheless, although particular embodiments of mobile drive unit 20 may provide such benefits, alternative embodiments may provide some, none, or all of these benefits.

Figure 2A:
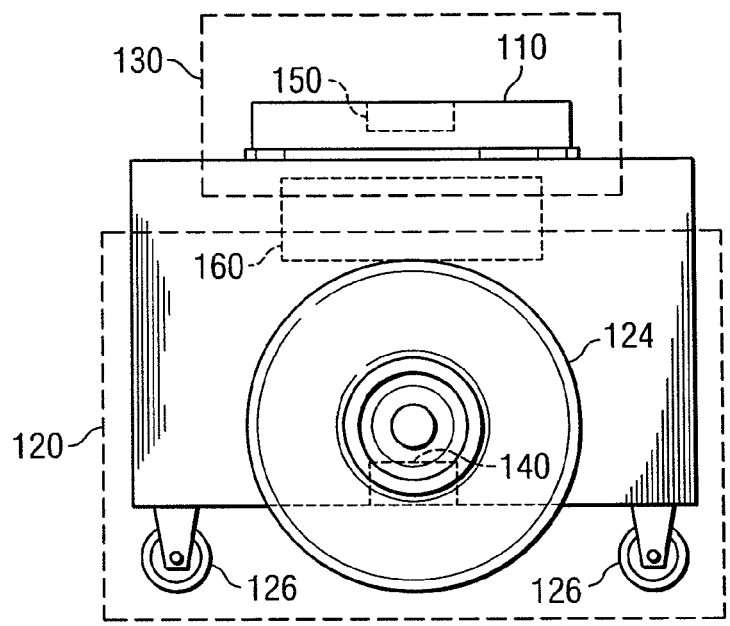
FIGS. 2A and 2B represents a cross-sectional diagram of a mobile drive unit according to a particular embodiment.
Figure 2B:
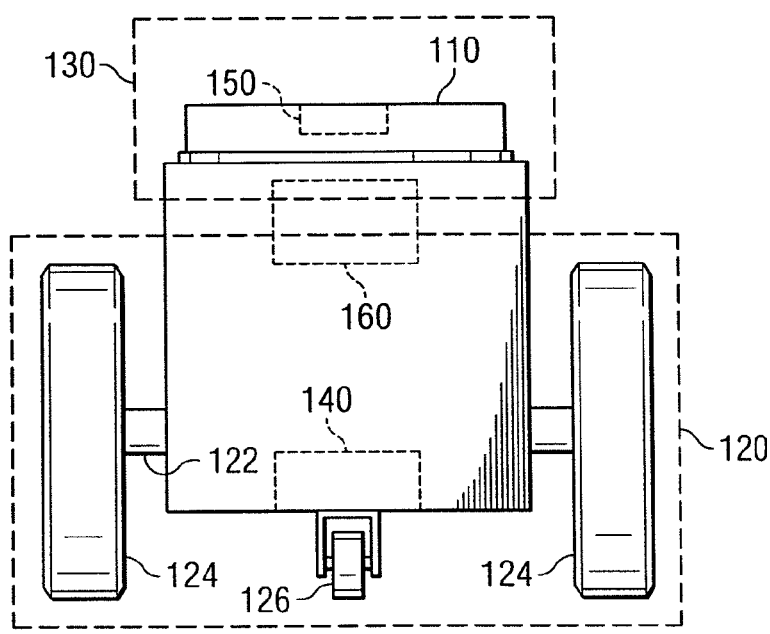

FIGS. 2A and 2B include a front and side view of a particular embodiment of mobile drive unit 20. Mobile drive unit 20 includes a docking head 110, a drive module 120, a docking actuator 130, and a control module 160. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140 and a holder sensor 150.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel drive module 120. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speed from one another.

Position sensor 140 represents one or more sensors, detectors, or other components suitable for determining the location of mobile drive unit 20 in any appropriate manner. For example, in particular embodiments, the workspace associated with inventory system 10 includes a number of fiducial marks that mark points on a two-dimensional grid that covers all or a portion of the workspace. In such embodiments, position sensor 140 may include a camera and suitable image- and/or video-processing components, such as an appropriately-programmed digital signal processor, to allow position sensor 140 to detect fiducial marks within the camera's field of view. Control module 160 may store location information that position sensor 140 updates as position sensor 140 detects fiducial marks. As a result, position sensor 140 may utilize fiducial marks to maintain an accurate indication of the location mobile drive unit 20 and to aid in navigation when moving within the workspace.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting a particular portion of inventory holder 30 or inventory holder 30 as a whole. For example, in particular embodiments, each inventory holder 30 in inventory system 10 includes a holder identifier that marks a predetermined location on that inventory holder 30. In certain examples of such embodiments, mobile drive unit 20 and inventory holder 30 may also be configured so that, when mobile drive unit 20 moves beneath inventory holder 30, mobile drive unit 20 is able to detect the holder identifier directly. In such embodiments, holder sensor 150 may include a camera and suitable image- and/or video-processing components, such as an appropriately-programmed digital signal processor, to allow holder sensor 150 to detect the holder identifier of a particular inventory holder 30 and to calculate the location of the inventory holder 30 based on this detection. As a result, mobile drive unit 20 may be configured to utilize these holder identifiers as reference points to aid in navigation when docking with or undocking from inventory holders 30.

Control module 160 monitors and/or controls operation of drive module 120 and docking actuator 130. Control module 160 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 160 may receive commands transmitted to mobile drive unit 20 and communicate information back to the management device utilizing appropriate communication components of mobile drive unit 20. Control module 160 may include any appropriate hardware and/or software suitable to provide the described functionality. In particular embodiments, control module 160 includes a general-purpose microprocessor programmed to provide the described functionality. Additionally, control module 160 may include all or portions of docking actuator 120, drive module 130, position sensor 140, and/or holder sensor 150, and/or share components with any of these elements of mobile drive unit 20.

Figure 3:
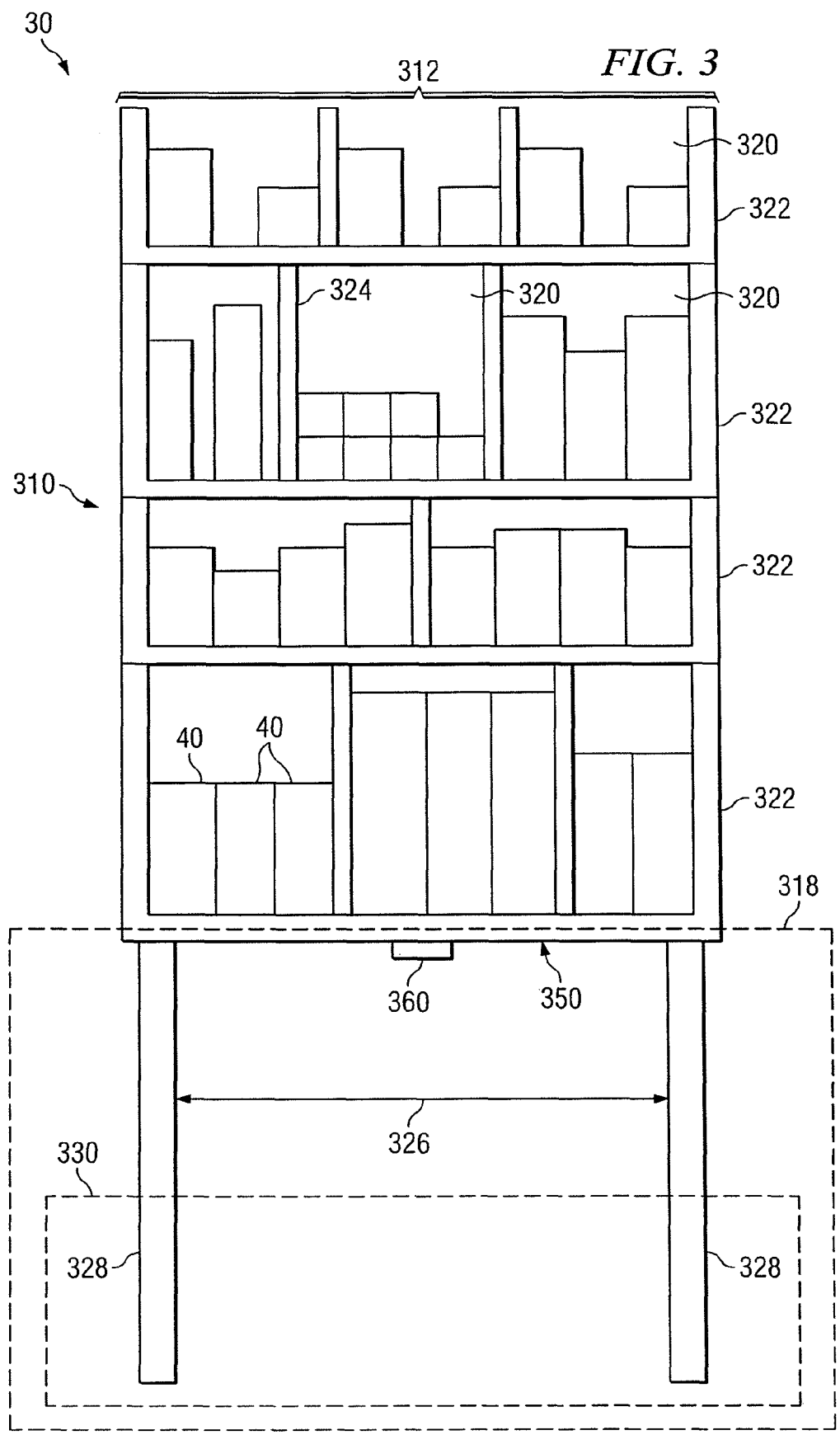
FIG. 3 illustrates the contents of an inventory holder according to a particular embodiment.

FIG. 3 illustrates inventory holder 30 in accordance with a particular embodiment. FIG. 3 illustrates the structure and contents of one side of inventory holder 30. In a particular embodiment, inventory holder 30 may comprise any number of faces with similar or different structure. As illustrated, inventory holder 30 includes a frame 310, a plurality of legs 328, and docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Additionally, in particular embodiments, inventory system 10 includes multiple inventory holders 30 and, in such embodiments, holder identifier 360 may uniquely identify the particular inventory holder 30 to which holder identifier is attached. As one example, in particular embodiments, holder identifier 360 may include a radio-frequency (RF) emitter that transmits an RF signal uniquely identifying inventory holder 30. As mobile drive unit 20 approaches a particular inventory holder 30, mobile drive unit 20 may be configured to detect the RF signal and determine which inventory holder 30 mobile drive unit 20 is approaching based on the detected RF signal. As another example, in particular embodiments, holder identifier 360 represents marker bearing a bar-code, and mobile drive unit 20 may be configured to read this bar-code while passing under inventory holder 30 and determine which inventory holder 30 mobile drive unit 20 is passing beneath based on the contents of the bar-code. Moreover, in such embodiments, the bar-code may represent a two-dimensional bar-code to allow more information to be stored in the bar-code and, thus, a greater number of inventory holders 30 may be utilized within inventory system 10.

FIGS. 4A-4H illustrate operation of particular embodiments of mobile drive unit 20 and inventory holder 30 during docking, movement, and undocking. For purposes of example, FIGS. 4A-4H illustrate particular embodiments of mobile drive unit 20 and inventory holder 30 configured to couple and uncouple while mobile drive unit 20 is positioned beneath inventory holder 30. As noted above, however, alternative embodiments of mobile drive unit 20 and inventory holder 30 may be configured to couple while mobile drive unit 20 is positioned in any appropriate manner relative to inventory holder 30. Additionally, although FIGS. 4A-4H illustrate operation of a particular embodiment of mobile drive unit 20 configured to detect its location and the location of inventory holder 30 using optical sensors, alternative embodiments of mobile drive unit 20 may be configured to determine the relevant locations using other appropriate forms of sensors, as described above.

Figure 4A:
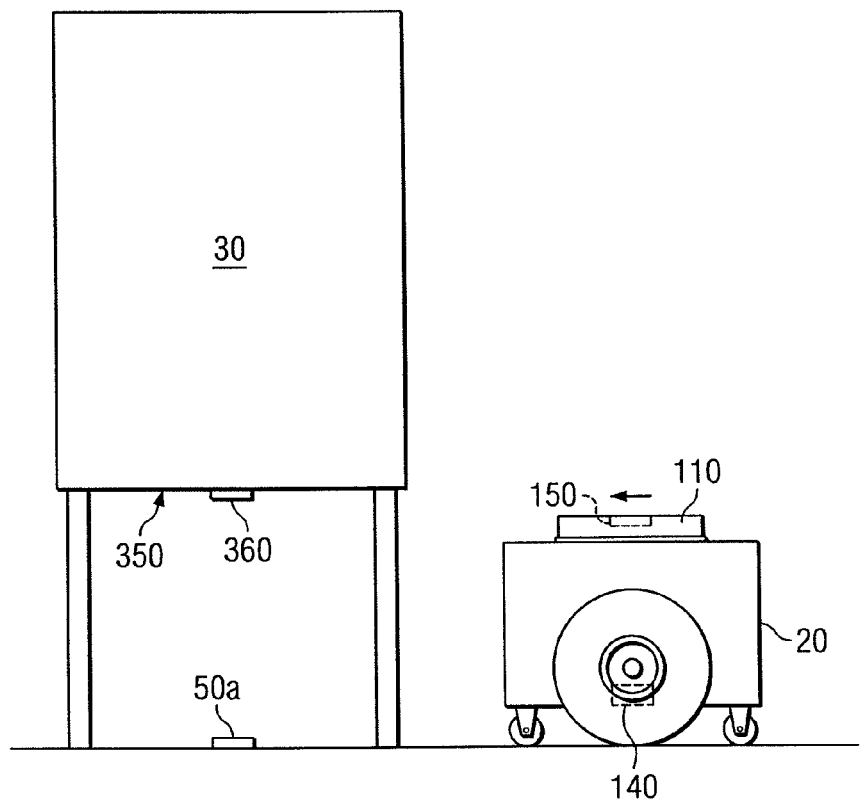
FIGS. 4A-4H show operation of various components of the mobile drive unit and the inventory holder during docking, movement, and undocking.

FIG. 4A illustrates mobile drive unit 20 and inventory holder 30 prior to docking. As noted above with respect to FIG. 1, mobile drive unit 20 may receive a command that identifies a location for a particular inventory holder 30. Mobile drive unit 20 may then move to the location specified in the command. Additionally, mobile drive unit 20 may utilize position sensor 140 to determine the location of mobile drive unit 20 to assist in navigating to the location of inventory holder 30.

In particular, FIG. 4A shows mobile drive unit 20 and inventory holder 30 as mobile drive unit 20 approaches the storage location identified by the received command. In the illustrated embodiment, the reference point is marked by fiducial mark 50a which comprises a surface operable to reflect light and which, as a result, can be detected by particular embodiments of position sensor 140 when mobile drive unit 20 is positioned over or approximately over fiducial mark 50a. As noted above, the illustrated embodiment of mobile drive unit 20 utilizes optical sensors, including a camera and appropriate image- and/or video processing components, to detect fiducial marks 50.

Figure 4B:
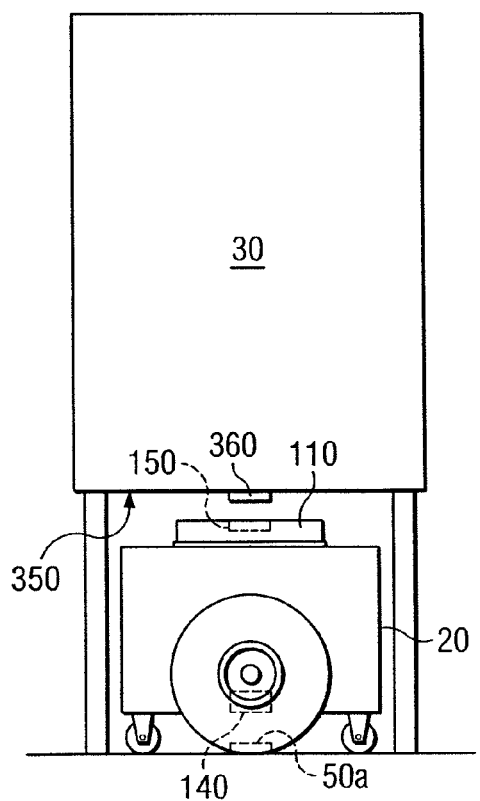

FIG. 4B illustrates mobile drive unit 20 and inventory holder 30 once mobile drive unit 20 reaches fiducial mark 50a. Because, in the illustrated example, fiducial mark 50a marks the location of the reference point to which mobile drive unit 20 is destined, mobile drive unit 20 begins the docking process once mobile drive unit 20 reaches fiducial mark 50a. In the illustrated example, mobile drive unit 20 is configured to dock with inventory holder 30 from a position beneath inventory holder 30 and, as a result, inventory holder 30 is stored so that docking surface 350 is located directly above fiducial mark 50a.

Although in the illustrated example, inventory holder 30, at this point, is assumed to be aligned with or within some tolerance of being aligned with fiducial mark 50a, particular embodiments of mobile drive unit 20 may be configured to additionally determine whether inventory holder 30 is aligned with fiducial mark 50a and, if not, to execute any appropriate additional steps to facilitate docking despite the misalignment of inventory holder 30. For example, in particular embodiments, mobile drive unit 20 may determine whether inventory holder 30 is appropriately aligned with fiducial mark 50a, such as by aligning itself with fiducial mark 50a and determining a difference between the location of mobile drive unit 20 and the location of inventory holder 30 or an appropriate portion of inventory holder 30. If the difference between the location of mobile drive unit 20 and the location of inventory holder 30 is greater than some predetermined tolerance, mobile drive unit 20 may then adjust its position based on the detected location of inventory holder 30 to facilitate docking.

Figure 4C:
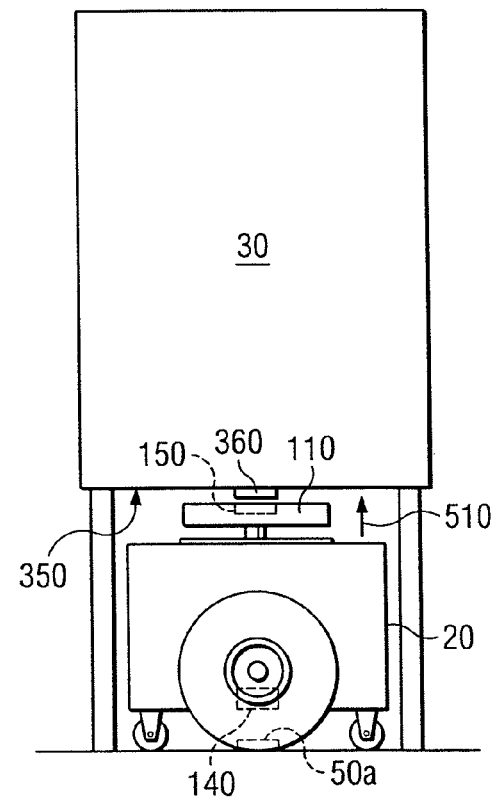

FIG. 4C illustrates operation of mobile drive unit 20 in docking with inventory holder 30. After positioning itself over fiducial mark 50a, mobile drive unit 20 begins the docking process. In the illustrated example, the docking process includes mobile drive unit 20 raising docking head 110 towards docking surface 350, as indicated by arrow 510. Additionally, in the illustrated example, mobile drive unit 20 and inventory holder 30 are configured so that mobile drive unit 20 lifts inventory holder 30 off the ground when mobile drive unit 20 docks with inventory holder 30 and, as a result, mobile drive unit 20 supports the weight of inventory holder 30 while mobile drive unit 20 is docked to inventory holder 30.

Figure 4D:
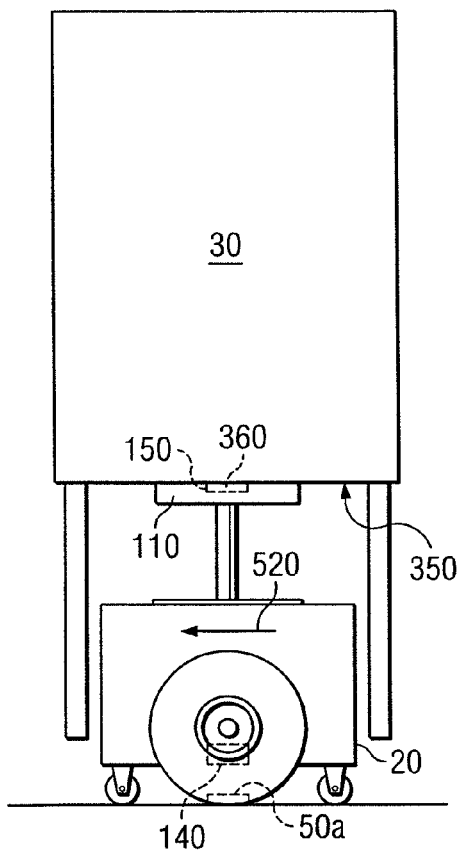

FIG. 4D illustrates operation of mobile drive unit 20 after docking with inventory holder 30. Mobile drive unit 20 is capable of inducing translational and/or rotational movement in inventory holder 30 while mobile drive unit 20 is docked with inventory holder 30. For example, in the illustrated embodiment, inventory holder 30 is supported by mobile drive unit 20 while the two components are docked and mobile drive unit 20 is capable of inducing translational and/or rotational movement in inventory holder 30 by moving or rotating itself or some sub-component of itself, such as docking head 110. As a result, while mobile drive unit 20 and inventory holder 30 are docked mobile drive unit 20 may move inventory holder 30 to a requested destination based on commands received by mobile drive unit 20, as suggested by arrow 520.

More specifically, after docking with inventory holder 30, mobile drive unit 20 may then move inventory holder 30 to the destination identified in the command received by mobile drive unit 20, propelling and/or rotating inventory holder 30 as appropriate. In particular embodiments, mobile drive unit 20 may monitor and update a calculation of its own location as it moves. For example, in particular embodiments, mobile drive unit 20 detects one or more fiducial marks 50 along the path to the requested destination and updates its location based on the detection of these fiducial marks 50. As a result, mobile drive unit 20 may be able to maintain an up-to-date approximation of its location while moving.

Once mobile drive unit 20 and inventory holder 30 arrive at the destination, mobile drive unit 20 may additionally rotate inventory holder 30 to present a particular face of inventory holder 30 to a packer or otherwise maneuver inventory holder 30 to allow access to inventory items 40 stored by inventory holder 30. Mobile drive unit 20 may then undock from inventory holder 30, as described below, or move inventory holder to another destination. For example, mobile drive unit 20 may move inventory holder 30 to a packing station where a packer can select appropriate inventory items 40 from inventory holder 30. Mobile drive unit 20 may then return inventory holder 30 to its original location or another location appropriate for undocking, such as a new storage location reserved for inventory holder 30.

Figure 4E:
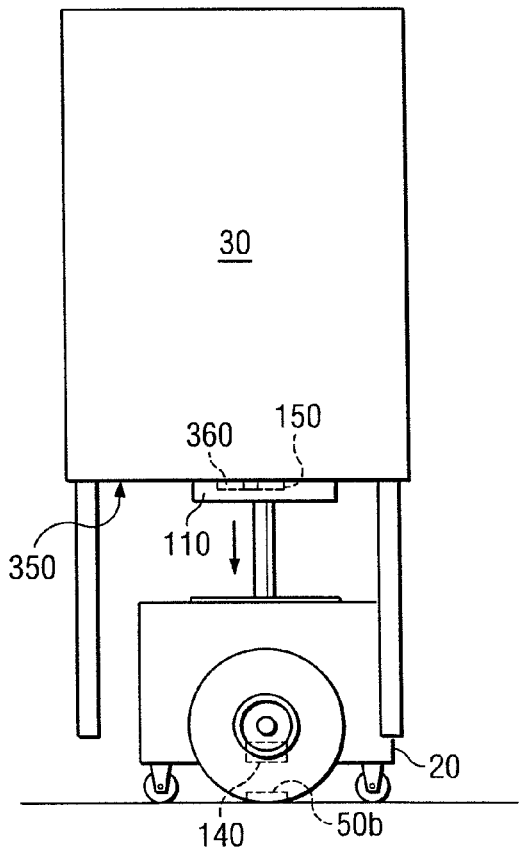

FIG. 4E illustrates mobile drive unit 20 and inventory holder 30 when the two components arrive at an appropriate point for undocking. As noted above, this may represent a final destination specified by the original command, the original storage location for inventory holder 30, or any other point within the workspace. At or near the destination, mobile drive unit 20 may detect another fiducial mark 50, fiducial mark 50b, associated with the undocking location. Mobile drive unit 20 determines its location based on fiducial mark 50b and, as a result, determines that it has reached the undocking location.

After determining that it has reached the undocking location, mobile drive unit 20 initiates an appropriate undocking process based on the configuration and characteristics of mobile drive unit 20 and inventory holder 30. As part of this process, mobile drive unit 20 may align mobile drive unit 20 with one or more fiducial markers 50 or other appropriate reference points on the workspace before undocking. Aligning with these reference points may allow mobile drive unit 20 to align inventory holder 30 to a grid associated with the workspace and, thus, to ensure that mobile drive unit 20 or other components of inventory system 10 can move within the workspace without interfering with inventory holder 30. After aligning mobile drive unit 20 based on the reference points, mobile drive unit 20 may undock from inventory holder 30. Mobile drive unit 20 may then execute any appropriate additional steps in undocking from inventory holder 30. For example, in the illustrated embodiment, mobile drive unit 20 supports inventory holder 30 on docking head 110 while mobile drive unit 20 and inventory holder 30 are docked. As a result, in this embodiment, mobile drive unit 20 undocks from inventory holder 30, in part, by lowering docking head 110. As mobile drive unit 20 lowers docking head 110, the weight of inventory holder 30 will be shifted from mobile drive unit 20 to legs 328.

Additionally, the location of inventory holder 30 relative to mobile drive unit 20 may shift during transit. As a result, the location of inventory holder 30 may not be properly aligned with fiducial marker 50b after undocking despite any steps taken by mobile drive unit 20 to align itself to fiducial marker 50b. Moreover, in particular embodiments, mobile drive units 20 may use the expected location of inventory holders to navigate within the workspace of inventory system 10. As a result, if inventory holder 30 is left at the requested destination without being properly aligned with fiducial marker 50b, other mobile drive units 20 may interfere with inventory holder 30, other mobile drive units 20 may subsequently have difficulty docking with inventory holder 30, and/or other related problems may arise. Consequently, mobile drive unit 20 may attempt to verify that inventory holder 30 is properly aligned with fiducial mark 50b and, if not, take appropriate steps to align inventory holder 30 with fiducial mark 50b.

For example, in particular embodiments, mobile drive unit 20 may, after undocking from inventory holder 30 determine a location of inventory holder 30. Mobile drive unit 20 may utilize holder sensor 150 to detect the location of inventory holder 30. Based on the information detected by holder sensor 150, mobile drive unit 20 may determine the difference between the location of mobile drive unit 20 and the location of inventory holder 30. If the difference is greater than some predetermined tolerance, mobile drive unit 20 may attempt to move inventory holder 30 to more closely align inventory holder 30 with the current location of mobile drive unit 20 and/or fiducial mark 50b, as shown in FIGS. 4F-4H.

Figure 4F:
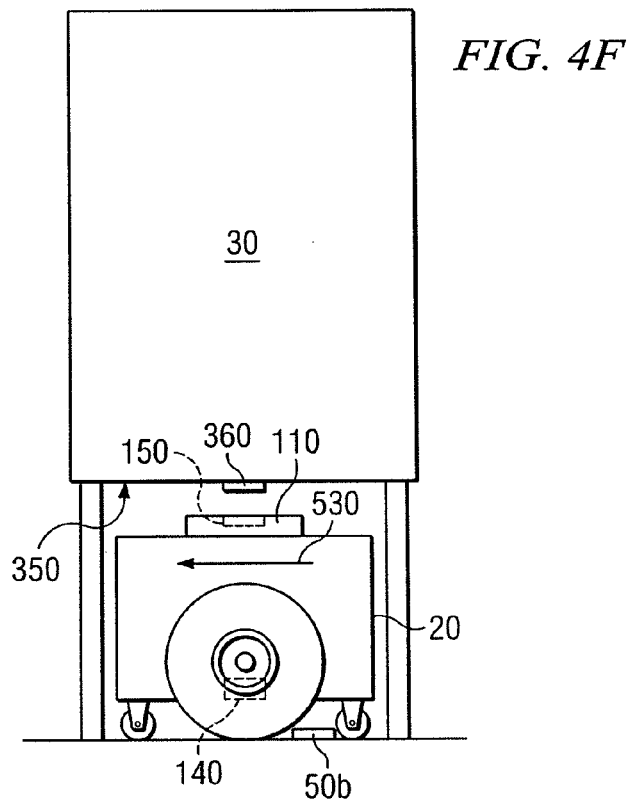
Figure 4G:
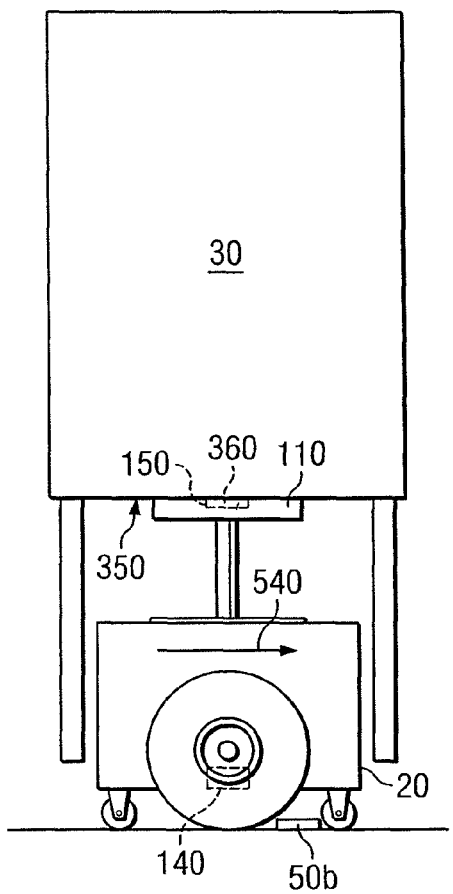
Figure 4H:
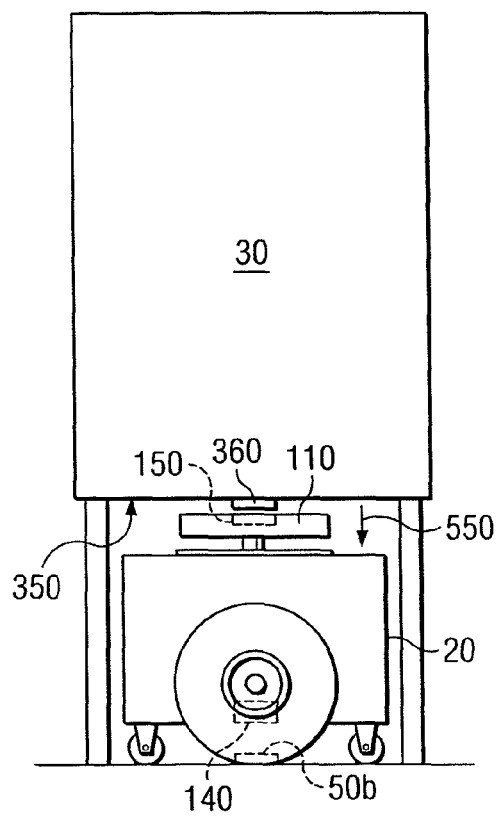

FIGS. 4F-4H illustrate operation of a particular embodiment of mobile drive unit 20 after determining that the location of inventory holder 30 differs from the location of mobile drive unit 20 and/or fiducial mark 50b by more than the predetermined tolerance. More specifically, FIG. 4F illustrates mobile drive unit 20 as mobile drive unit 20 positions itself under inventory holder 30. In particular, after determining that the location of inventory holder 30 differs from the current location of mobile drive unit 20 and/or that of fiducial mark 50b by more than the predetermined tolerance, mobile drive unit 20, in the illustrated embodiment, moves to a new location based on the detected location of inventory holder 30, as shown by arrow 530. In the illustrated embodiment, mobile drive unit 20 repositions itself so that holder sensor 150 is located under holder identifier 360. Mobile drive unit 20 then docks with inventory holder 30 again in a similar manner to that shown in FIG. 4C.

FIG. 4G illustrates the operation of a particular embodiment of mobile drive unit 20 after docking with inventory holder 30 a second time to correct the location of inventory holder 30. After docking with inventory holder 30 again, mobile drive unit 20 moves back towards the requested destination, as suggested by arrow 540. Mobile drive unit 20 may continue moving towards the requested destination until mobile drive unit 20 detects fiducial mark 50b again.

FIG. 4H illustrates the operation of a particular embodiment of mobile drive unit 20 after reaching the requested destination a second time. After aligning with fiducial mark 50b again, mobile drive unit 20 undocks from inventory holder 30. In the illustrated embodiment, mobile drive unit 20 undocks from inventory holder 30 by lowering docking head 110 as suggested by arrow 550. Because, in particular embodiments, the movement to correctly align inventory holder 30 with the requested destination will often be significantly smaller than the movement from the original location to the requested destination, the chances of any slippage, jostling, or other error-inducing incidents will be much smaller. Consequently, this correction technique may substantially improve the precision with which inventory holder 30 can be stored.

Mobile drive unit 20 may then move away from inventory holder 30 and begin responding to other commands received by mobile drive unit 20. Alternatively, mobile drive unit 20 may repeat the determination of the location of inventory holder 30 and again attempt to align inventory holder 30 to fiducial mark 50b. Moreover, mobile drive unit 20 may perform these steps until completing a predetermined number of iterations or indefinitely until inventory holder 30 is finally aligned with fiducial mark 50b. Repeating this process may improve the precision of the inventory holder's storage beyond the improvement produced by the initial correction.

In alternative embodiments, mobile drive unit 20 may use information from sensor 140 and sensor 150 to calculate the relative offset of inventory holder 30 from desired location 50b and then make corrective moves prior to undocking that results in inventory holder 30 being positioned within tolerance to fiducial 50b. This process reduces the amount of time required to accurately place the inventory holder 30 on the grid. Additionally, mobile drive unit 20 may perform this difference calculation at any point along a path to or from storage destinations and make a determination that it should undock and redock to improve the location of the inventory holder 30 relative to the drive unit 20. An example of this operation is discussed below with respect to FIG. 7.

Thus, in particular embodiments of inventory system 10, mobile drive unit 20 may be capable of using certain techniques to correct the location of inventory holder 30 after transporting inventory holder 30 between points within the workspace of inventory system 10. This may reduce the occurrence of operational errors in inventory system 10. Additionally, in particular embodiments, implementation of such techniques may also allow for greater automation of the operation of inventory system 10, permit the use of a smaller workspace, and/or prevent improperly positioned inventory holders 30 from interfering with the normal operation of the inventory system 10. As a result, particular embodiments of mobile drive unit 20 may provide multiple benefits. Nonetheless, although particular embodiments of mobile drive unit 20 may provide such benefits, alternative embodiments may provide some, none, or all of these benefits.

Additionally, although FIGS. 4A-4H focus, for the sake of illustration, on an embodiment of mobile drive unit 20 that detects and correct misalignments of inventory holder 30 immediately following undocking, in alternative embodiments, mobile drive unit 20 may be configured to detect a misalignment at other appropriate times after mobile drive unit 20 has moved inventory holder 30. Moreover, the techniques utilized by mobile drive unit 20 to detect and correct the misalignment may vary depending on when mobile drive unit 20 detects and/or corrects the misalignment. As discussed below, FIG. 5 is a flowchart detailing a technique utilized by particular embodiments of mobile drive unit 20 to detect and correct misalignments of inventory holder 30 immediately after undocking, similar to the embodiment and techniques illustrated in FIGS. 4A-4H. Furthermore, FIG. 6 is a flowchart detailing a technique utilized by particular embodiments of mobile drive unit 20 to detect and correct misalignments of inventory holder 30 before subsequent dockings with that inventory holder 30. In general, however, mobile drive unit 20 may be configured to detect and/or correct the misalignment of inventory holder 30 at any appropriate time using any suitable techniques.

FIG. 5 is a flowchart illustrating operation of a particular embodiment of mobile drive unit 20 during the docking and undocking process illustrated by FIGS. 4A-4H. Some of the steps illustrated in FIG. 5 may be combined, modified, or deleted where appropriate, and additional steps may also be added to the flowchart. Additionally, steps may be performed in any suitable order without departing from the scope of the invention.

Operation begins at step 600 with mobile drive unit 20 receiving a command identifying an inventory holder 30 to be moved or a location for an inventory holder 30 to be moved. In response to receiving the command, mobile drive unit 20 moves to or near the starting location for the identified inventory holder 30 at step 602. In particular embodiments, mobile drive unit 20 may position mobile drive unit 20 under the identified inventory holder 30, at step 604, or perform any other adjustments to align mobile drive unit 20 with inventory holder 30, prepare mobile drive unit 20 or inventory holder 30 for docking, and/or otherwise facilitate docking and transport.

Mobile drive unit 20 may then initiate docking at step 606. In particular embodiments, mobile drive unit 20 initiates docking by raising docking head 110. When docking head 110 contacts docking surface 350 of inventory holder 30, mobile drive unit 20 begins lifting inventory holder 30 off the ground. As a result, in such embodiments, mobile drive unit 20 supports inventory holder 30 once mobile drive unit 20 is docked with inventory holder 30.

At step 608, mobile drive unit 20 moves inventory holder 30 towards a destination requested by the received command. As noted above, while moving, mobile drive unit 20 may continually monitor and/or periodically make an updated determination of the location of mobile drive unit 20 and/or the relative positions of mobile drive unit 20 and inventory holder 30. In particular embodiments, mobile drive unit 20 may monitor or determine the location of mobile drive unit 20 by detecting fixed objects, such as fiducial markers 50, as mobile drive unit 20 moves.

At step 610, mobile drive unit 20 determines that mobile drive unit 20 has reached the requested destination. In particular embodiments, mobile drive unit 20 may determine that mobile drive unit 20 has reached the requested determination by detecting a fixed object, such as a fiducial marker 50 associated with the requested destination. Upon reaching the requested destination, mobile drive unit 20 undocks from inventory holder 30 at step 612. In particular embodiments, mobile drive unit 20 may undock by lowering a docking head 110 that is supporting inventory holder 30.

After undocking, mobile drive unit 20, mobile drive unit 20 may determine the location of inventory holder 30 at step 614. Alternatively, in certain embodiments, mobile drive unit 20 may determine the location of inventory holder 30 prior to undocking. In general, however, mobile drive unit 20 may include a holder sensor 150 that is capable of detecting some portion or feature of inventory holders 30, such as a holder identifier 360, that holder sensor 150 can use to determine the location of the relevant inventory holder 30 relative to mobile drive unit 20. Mobile drive unit 20 may then calculate, at step 616, a difference between the location of inventory holder 30 and the requested destination. At step 618, mobile drive unit 20 may determine whether the difference is greater than a predetermined tolerance. If the difference is not greater than the predetermined tolerance, mobile drive unit 20 may then move away from inventory holder 30, at step 620, and proceed with responding to other commands. The operation of mobile drive unit 20, with respect to moving this inventory holder 30, may then end, as shown in FIG. 5.

If instead, the difference is greater than the predetermined tolerance, mobile drive unit 20 may move mobile drive unit 20 to another point based on the determined location of inventory holder 30 and/or the difference between the determined location of inventory holder 30 and the requested destination. For example, in particular embodiments, such as the one illustrated in FIGS. 4A-4H, mobile drive unit 20 may move to the detected location of inventory holder 30 at step 622. Mobile drive unit 20 then docks with inventory holder 30 again at step 624.

After docking with inventory holder 30 again, mobile drive unit 20 moves inventory holder 30 towards the requested destination at step 626. When mobile drive unit 20 reaches the requested destination, mobile drive unit 20 undocks from inventory holder 30 again at step 628. Mobile drive unit 20 may then move away from inventory holder 30, at step 630, and proceed with responding to other commands. The operation of mobile drive unit 20, with respect to moving this inventory holder 30, may then end, as shown in FIG. 5. Alternatively, in particular embodiments, mobile drive unit 20 may determine the location of inventory holder 30 again and repeat any of the above steps again as appropriate based on the configuration of mobile drive unit 20.

Additionally, in alternative embodiments, mobile drive unit 20 may detect and correct misalignments in inventory holder 30 before undocking from inventory holder 30 the first time. This may allow mobile drive unit 20 to reduce the time and/or power expended in correcting misalignments. An example of such a process is illustrated below with respect to FIG. 7.

FIG. 6 is a flowchart illustrating operation of an alternative embodiment of mobile drive unit 20 in detecting and correcting a misalignment of inventory holder 30 subsequent to inventory holder 30 being moved within the workspace of inventory system 10. Any of the steps illustrated in FIG. 6 may be combined, modified, or deleted where appropriate, and additional steps may also be added to the flowchart. Additionally, steps may be performed in any suitable order without departing from the scope of the invention.

In the example, described by the flowchart in FIG. 6, mobile drive unit 20 begins operation undocked from any inventory holder 30. Operation begins at step 700 with mobile drive unit 20 receiving a command identifying an inventory holder 30 to be moved or a location for an inventory holder 30 to be moved and a desired destination for that inventory holder 30. In response to receiving the command, mobile drive unit 20 moves to or near the starting location for the identified inventory holder 30 at step 702. In particular embodiments, mobile drive unit 20 may position mobile drive unit 20 under the identified inventory holder 30, at step 704, or perform any other adjustments to align mobile drive unit 20 with inventory holder 30, prepare mobile drive unit 20 or inventory holder 30 for docking, and/or otherwise facilitate docking and transport.

Additionally, in the described embodiment, mobile drive unit 20 may determine the location of inventory holder 30 at step 706. At step 708, mobile drive unit 20 may determine a difference between the location of inventory holder 30 and the designated location for that inventory holder 30. For example, the command received by mobile drive unit 20 may identify a location at which this same mobile drive unit 20 or another mobile drive unit 20 previously stored the relevant inventory holder 30. Mobile drive unit 20 may move to the designated location, determine the actual location of inventory holder 30 once at or near the designated location, and calculate a difference between the actual location and the designated location.

If the difference between the actual location of inventory holder 30 and the designated location of inventory holder 30 is greater than some predetermined tolerance, in particular embodiments, mobile drive unit 20 may take appropriate remedial action to correct the misalignment. For example, in the described embodiment, mobile drive unit 20 calculates a correction value based on the difference between the designated location and the actual location at step 710.

Additionally, in the described embodiment, mobile drive unit 20 determines an adjusted destination using the correction value at step 712. For example, if mobile drive unit 20 determines upon arriving at the designated location that the relevant inventory holder 30 is a quarter inch east of the designated location for that inventory holder 30, mobile drive unit 20 may determine an adjusted destination that is a quarter inch west of the destination location specified by the command.

At step 714, mobile drive unit 20 may dock with inventory holder 30. Mobile drive unit 20 may then move mobile drive unit 20 and inventory holder 30 to the adjusted destination at step 716. At step 718, mobile drive unit 20 may undock from inventory holder 30 at the adjusted destination. In particular embodiments, mobile drive unit 20 may take additional steps to detect and/or correct any remaining or subsequently occurring misalignment of inventory holder 30 after arriving at the adjusted destination and/or after undocking to further reduce the potential for misalignments. For example, in particular embodiments, mobile drive unit 20 may, after undocking, attempt to detect and correct any misalignments using techniques similar to those described above in FIG. 5. Mobile drive unit 20 may then move away from inventory holder 30, at step 740, and proceed with responding to other commands. The operation of mobile drive unit 20, with respect to moving this inventory holder 30, may then end, as shown in FIG. 6.

As noted above, the steps illustrated in FIG. 6 may be performed in any appropriate order. For example, instead of determining the location of inventory holder 30 prior to docking, mobile drive unit 20 may alternatively determine the location of inventory holder 30 relative to mobile drive unit 20 after docking with inventory holder 30 and while in transit to the destination location. Mobile drive unit 20 may then use this relative location of inventory holder 30 to calculate the adjustment factor and to determine the adjusted destination. An example of such a process is illustrated below with respect to FIG. 8.

Figure 7:
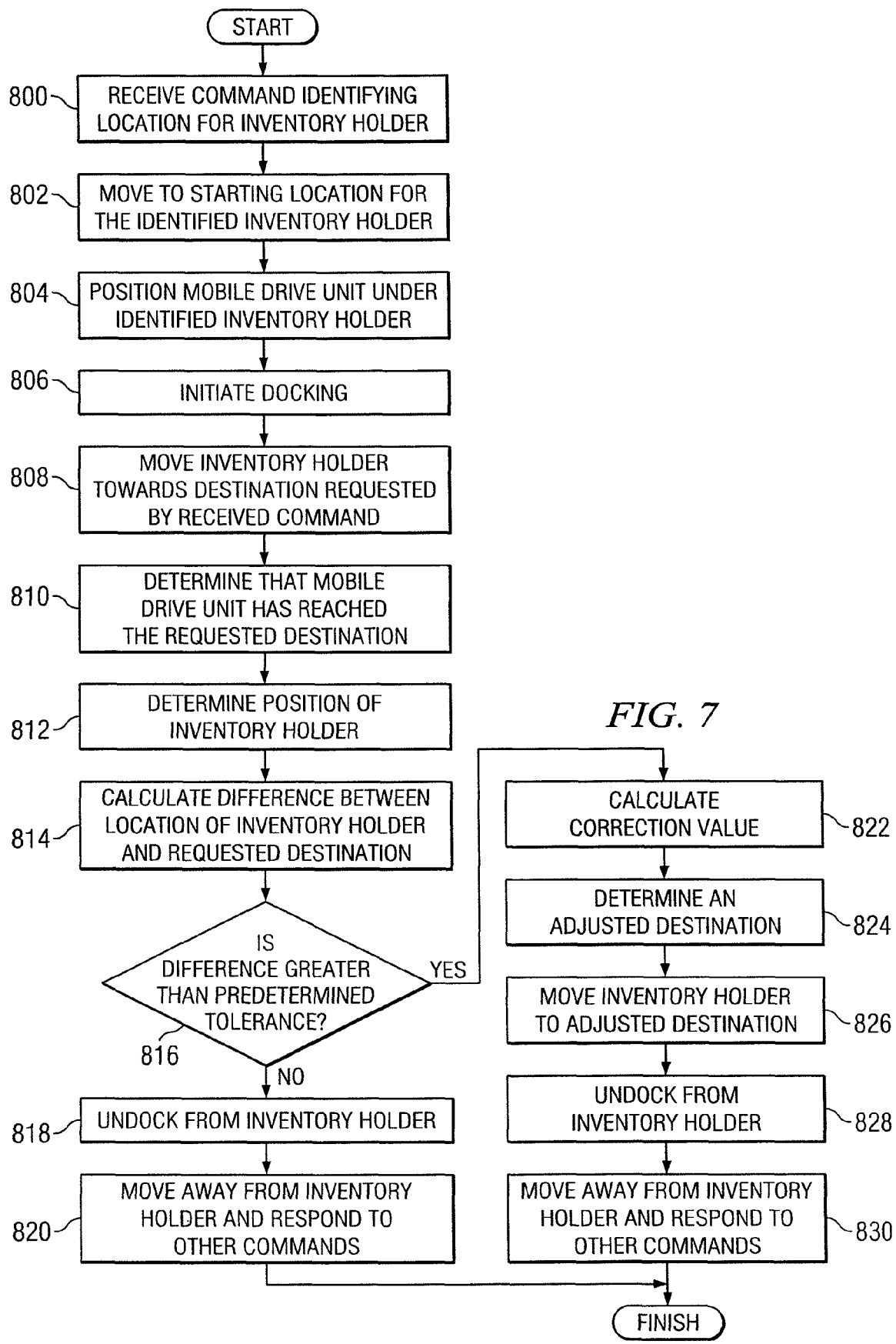
FIG. 7 is a flowchart illustrating yet other aspects of the operation of particular embodiments of mobile drive unit.

FIG. 7 is a flowchart illustrating another example technique that may be utilized by particular embodiments of mobile drive units 20 to detect and correct misalignments when transporting inventory holders 30. In particular, FIG. 7 illustrates a technique in which, after moving an inventory holder 30 to a requested destination, mobile drive unit 20 may detect a misalignment in the relevant inventory holder 30 prior to undocking from that inventory holder 30. Some of the steps illustrated in FIG. 7 may be combined, modified, or deleted where appropriate, and additional steps may also be added to the flowchart. Furthermore, steps may be performed in any suitable order without departing from the scope of the invention.

In this embodiment, operation begins at step 800 with mobile drive unit 20 receiving a command identifying an inventory holder 30 to be moved or a location for an inventory holder 30 to be moved. In response to receiving the command, mobile drive unit 20 moves to or near the starting location for the identified inventory holder 30 at step 802. In particular embodiments, mobile drive unit 20 may position mobile drive unit 20 under the identified inventory holder 30, at step 804, or perform any other adjustments to align mobile drive unit 20 with inventory holder 30, prepare mobile drive unit 20 or inventory holder 30 for docking, and/or otherwise facilitate docking and transport.

Mobile drive unit 20 may then initiate docking at step 806. In particular embodiments, mobile drive unit 20 initiates docking by raising docking head 110. When docking head 110 contacts docking surface 350 of inventory holder 30, mobile drive unit 20 begins lifting inventory holder 30 off the ground. As a result, in such embodiments, mobile drive unit 20 supports inventory holder 30 once mobile drive unit 20 is docked with inventory holder 30.

At step 808, mobile drive unit 20 moves inventory holder 30 towards a destination requested by the received command. As noted above, while moving, mobile drive unit 20 may continually monitor and/or periodically make an updated determination of the location of mobile drive unit 20 and/or the relative position of mobile drive unit 20 and inventory holder 30. In particular embodiments, mobile drive unit 20 may monitor or determine the location of mobile drive unit 20 by detecting fixed objects, such as fiducial markers 50, as mobile drive unit 20 moves. At step 810, mobile drive unit 20 determines that mobile drive unit 20 has reached the requested destination. In particular embodiments, mobile drive unit 20 may determine that mobile drive unit 20 has reached the requested determination by detecting a fixed object, such as a fiducial marker 50 associated with the requested destination.

Upon reaching the requested destination, mobile drive unit 20 may determine the location of inventory holder 30 at step 812. As noted above, mobile drive unit 20 may include a holder sensor 150 that is capable of detecting some portion or feature of inventory holders 30, such as a holder identifier 360, that holder sensor 150 can use to determine the location of the relevant inventory holder 30 relative to mobile drive unit 20. Mobile drive unit 20 may then calculate, at step 814, a difference between the location of inventory holder 30 and the requested destination. At step 816, mobile drive unit 20 may determine whether the difference is greater than a predetermined tolerance.

If the difference is not greater than a predetermined tolerance, mobile drive unit 20 may undock from inventory holder 30 at step 818. In particular embodiments, mobile drive unit 20 may undock by lowering a docking head 110 that is supporting inventory holder 30. Mobile drive unit 20 may then move away from inventory holder 30, at step 820, and proceed with responding to other commands. The operation of mobile drive unit 20, with respect to moving this inventory holder 30, may then end, as shown in FIG. 7.

If, instead, the difference between the actual location of inventory holder 30 and the requested destination is greater than the predetermined tolerance, in particular embodiments, mobile drive unit 20 may take appropriate remedial action to correct the misalignment. For example, in the described embodiment, mobile drive unit 20 calculates a correction value based on the difference between the requested destination and the actual location of inventory holder 30 at step 822. In particular embodiments, the correction value may represent a distance and/or direction in which to adjust the location of inventory holder 30 to correct for the detected misalignment.

Additionally, in the described embodiment, mobile drive unit 20 determines an adjusted destination using the correction value at step 824. For example, if mobile drive unit 20 determines upon arriving at the requested destination that the relevant inventory holder 30 has shifted during transport and is now a quarter inch to the east of its anticipated location while docked with mobile drive unit 20, mobile drive unit 20 may determine an adjusted destination that is a quarter inch west of the requested destination specified by the command. Mobile drive unit 20 may then move mobile drive unit 20 and inventory holder 30 to the adjusted destination at step 826.

At step 828, mobile drive unit 20 may then undock from inventory holder 30 at the adjusted destination. In particular embodiments, mobile drive unit 20 may take additional steps to detect and/or correct any remaining or subsequently occurring misalignment of inventory holder 30 after arriving at the adjusted destination and/or after undocking to further reduce the potential for misalignments. For example, in particular embodiments, mobile drive unit 20 may, after undocking, attempt to detect and correct any misalignments using techniques similar to those described above in FIG. 5. Mobile drive unit 20 may then move away from inventory holder 30, at step 830, and proceed with responding to other commands. The operation of mobile drive unit 20, with respect to moving this inventory holder 30, may then end, as shown in FIG. 6.

By determining whether inventory holder 30 is misaligned before undocking, particular embodiments of mobile drive unit 20 may be able to limit the time and power expended in correcting such misalignments. In particular embodiments, this may reduce the time required to respond to orders and/or limit the frequency with which mobile drive units 20 must recharge its power supply. As a result, embodiments of mobile drive unit 20 that operate as described by FIG. 7 may provide a number of operational benefits.

Figure 8:
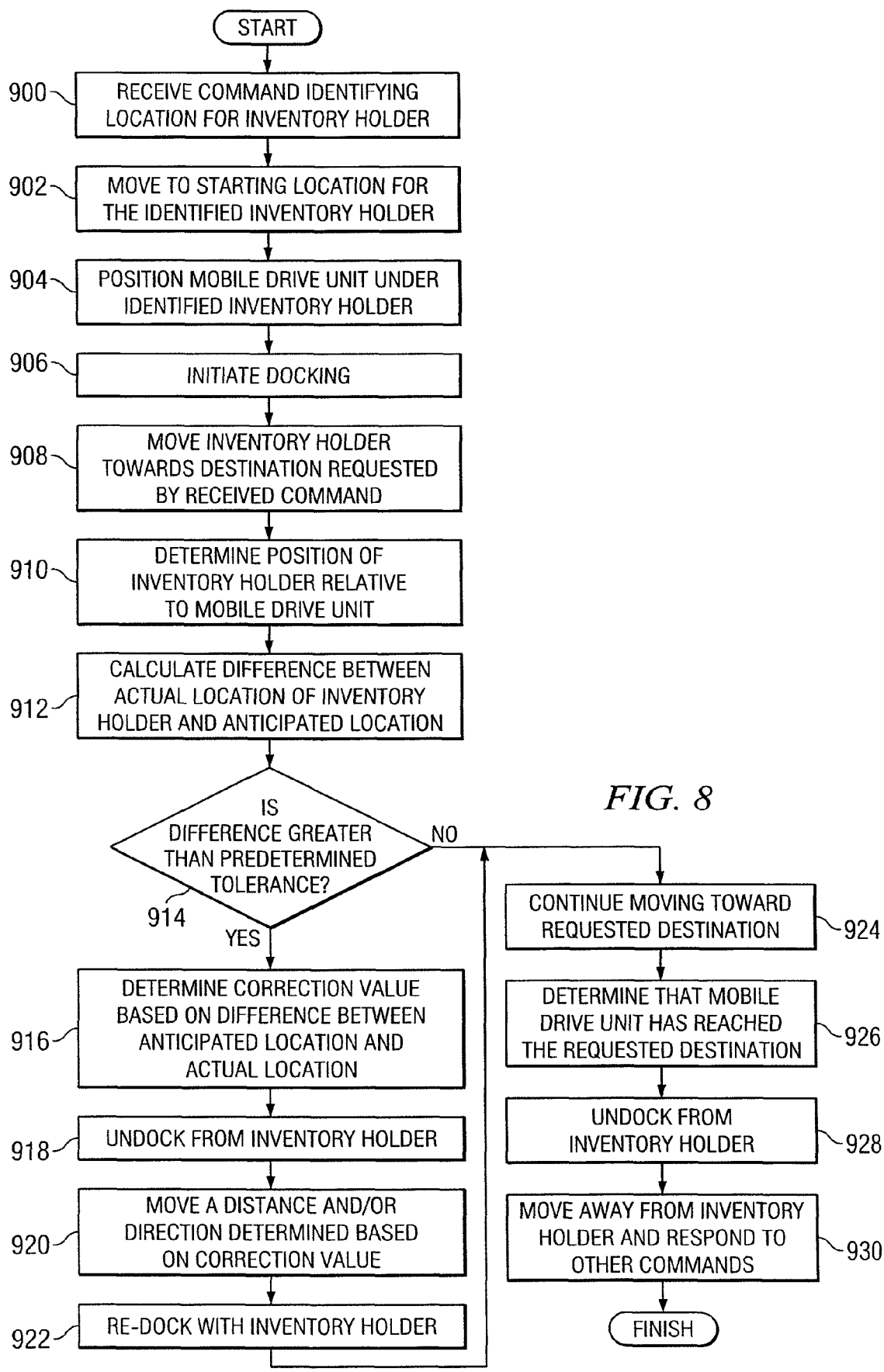
FIG. 8 is a flowchart illustrating yet other aspects of the operation of particular embodiments of mobile drive unit.

FIG. 8 illustrates another example technique that may be utilized by certain embodiments of mobile drive unit 20 in detecting and correcting misalignments of inventory holder 30. In particular, FIG. 8 illustrates a technique in which mobile drive unit 20 determines, while in transit to a requested destination, that inventory holder 30 is misaligned and corrects for this misalignment before arriving at the requested destination. Some of the steps illustrated in FIG. 8 may be combined, modified, or deleted where appropriate, and additional steps may also be added to the flowchart. Additionally, steps may be performed in any suitable order without departing from the scope of the invention.

In this embodiment, operation begins at step 900 with mobile drive unit 20 receiving a command identifying an inventory holder 30 to be moved or a location for an inventory holder 30 to be moved. In response to receiving the command, mobile drive unit 20 moves to or near the starting location for the identified inventory holder 30 at step 902. In particular embodiments, mobile drive unit 20 may position mobile drive unit 20 under the identified inventory holder 30, at step 904, or perform any other adjustments to align mobile drive unit 20 with inventory holder 30, prepare mobile drive unit 20 or inventory holder 30 for docking, and/or otherwise facilitate docking and transport.

Mobile drive unit 20 may then initiate docking at step 906. In particular embodiments, mobile drive unit 20 initiates docking by raising docking head 110. When docking head 110 contacts docking surface 350 of inventory holder 30, mobile drive unit 20 begins lifting inventory holder 30 off the ground. As a result, in such embodiments, mobile drive unit 20 supports inventory holder 30 once mobile drive unit 20 is docked with inventory holder 30. At step 908, mobile drive unit 20 moves inventory holder 30 towards a destination requested by the received command.

At some point while moving toward the requested destination, mobile drive unit 20 may determine the location of inventory holder 30 relative to mobile drive unit 20, as shown at step 910. For example, in particular embodiments, mobile drive unit 20 may be configured to periodically check the location of inventory holder 30 relative to mobile drive unit 20 while moving inventory holder 30 to the requested destination. Mobile drive unit 20 then calculates, at step 912, a difference between the location of inventory holder 30 and its anticipated location while docked with mobile drive unit 20. In particular embodiments, mobile drive unit 20 may be programmed with information specifying the anticipated location of a particular portion of inventory holder 30 (such as holder identifier 360) relative to mobile drive unit 20 when inventory holder 30 is docked and properly aligned with mobile drive unit 20. In such embodiments, mobile drive unit 20 may calculate the difference between the location of inventory holder 30 and its anticipated location based on the difference between the location of the relevant portion and the anticipated location of that portion of inventory holder 30.

At step 914, mobile drive unit 20 then determines whether the difference between the actual location of inventory holder 30 and the anticipated location of inventory holder 30 is greater than a predetermined tolerance. If the difference is not greater than the predetermined tolerance, operation of mobile drive unit 20 continues at step 924. If, instead, the difference is greater than the predetermined tolerance, mobile drive unit 20 may determine a correction value based on this difference at step 916. As noted above, mobile drive unit 20 may, in particular embodiments, be programmed with information specifying the anticipated location of a particular portion of inventory holder 30 (such as holder identifier 360) relative to mobile drive unit 20. Mobile drive unit 20 may determine, while moving, the location of this portion of inventory holder 30 and, if the location of the relevant portion differs from its anticipated location by more than the predetermined tolerance, determine an appropriate correction value based on the magnitude and/or direction of the misalignment. For example, if mobile drive unit 20 determines that the relevant portion of inventory holder 30 is a quarter inch to the east of the anticipated location for this portion of inventory holder 30, mobile drive unit 20 may determine a correction value that is a quarter inch to the west.

Mobile drive unit 20 then undocks from inventory holder 30 at step 918. At step 920, mobile drive unit 20 moves a distance and/or direction determined based on the correction value. Returning to the quarter-inch misalignment example, mobile drive unit 20, in accordance with the correction value calculated for this misalignment, moves a quarter inch to the west to correct the misalignment. Then, after completing any appropriate movements based on the correction value, mobile drive unit 20 re-docks with inventory holder at step 922.

After correcting any existing misalignment or determining that any misalignment is less than the predetermined tolerance, mobile drive unit 20 may continue moving toward the requested destination at step 924. At step 926, mobile drive unit 20 may then determine that mobile drive unit 20 has reached the requested destination. Mobile drive unit 20 then undocks from inventory holder 30 at step 928. After undocking, mobile drive unit 20 may then move away from inventory holder 30 and respond to other commands at step 930. Operation of mobile drive unit 20 with respect to moving this particular inventory holder 30 may then end as shown in FIG. 8.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for transporting inventory items, comprising:
    moving a mobile drive unit to a first point while the mobile drive unit is docked with an inventory holder;
    determining a location of the inventory holder while the mobile drive unit is docked with the inventory holder;
    calculating a difference between the location of the inventory holder and the first point;
    determining whether the difference is greater than a predetermined tolerance;
    in response to determining that the difference is less than the predetermined tolerance, undocking from the inventory holder; and
    in response to determining that the difference is greater than the predetermined tolerance:
        moving the mobile drive unit to a second point based on the location of the inventory holder; and
        undocking the mobile drive unit with the inventory holder.

2. The method of claim 1, wherein the moving the mobile drive unit to a second point comprises:
    determining an adjusted location based, at least in part, on the location of the inventory holder; and
    moving the inventory holder to the adjusted location.

3. The method of claim 1, wherein determining the location of the inventory holder while the mobile drive unit is docked with the inventory holder comprises determining a location of the mobile drive unit and determining a position of at least part of the inventory holder relative to the location of the mobile drive unit.

4. The method of claim 3, wherein determining the location of the mobile drive unit comprises:
    detecting a fixed object; and
    determining the location of the mobile drive unit based on the fixed object.

5. The method of claim 1, wherein determining the location of the inventory holder while the mobile drive unit is docked with the inventory holder comprises:
    detecting a holder identifier associated with the inventory holder; and
    determining the location of the inventory holder based on a position of the holder identifier relative to a location of the mobile drive unit.

6. The method of claim 1, further comprising determining that the mobile drive unit has reached the first point based on detecting a fixed object associated with the first point.

7. An apparatus comprising:
    a drive module operable to propel the apparatus towards a destination;
    a docking actuator operable to facilitate docking with an inventory holder;
    a control module operable to:
        cause the apparatus to move to a first point while the apparatus is docked with an inventory holder;
        determine a location of the inventory holder while the apparatus is docked with the inventory holder;
        calculate a difference between the location of the inventory holder and the first point;
        determine whether the difference is greater than a predetermined tolerance;

in response to determining that the difference is less than the predetermined tolerance, cause the apparatus to undock from the inventory holder; and in response to determining that the difference is greater than the predetermined tolerance:
cause the apparatus to move to a second point based on the location of the inventory holder; and
cause the apparatus to undock with the inventory holder.

8. The apparatus of claim 7, wherein the control module is operable to cause the apparatus to move to the second point by:
determining an adjusted location based, at least in part, on the location of the inventory holder; and
causing the apparatus to move the inventory holder to the adjusted location.

9. The apparatus of claim 7, wherein the control module is operable to determine the location of the inventory holder while the apparatus is docked with the inventory holder by:
determining a location of the apparatus; and
determining a position of at least part of the inventory holder relative to the location of the apparatus.

10. The apparatus of claim 9, wherein the control module is operable to determine the location of the apparatus by:
detecting a fixed object; and
determining the location of the apparatus based on the fixed object.

11. The apparatus of claim 7, wherein the control module is operable to determine the location of the inventory holder while the apparatus is docked with the inventory holder by:
detecting a holder identifier associated with the inventory holder; and
determining the location of the inventory holder based on a position of the holder identifier relative to a location of the apparatus.

12. The apparatus of claim 7, the control module further operable to determine that the apparatus has reached the first point based on detecting a fixed object associated with the first point.

13. The apparatus of claim 7, further comprising means for determining a location of the apparatus.

14. A system for storing inventory items, comprising:
an inventory holder operable to store inventory items; and
a mobile drive unit operable to:
move to a first point while docked with an inventory holder;
determine a location of the inventory holder while docked with the inventory holder;
calculate a difference between the location of the inventory holder and the first point;
determine whether the difference is greater than a predetermined tolerance;
in response to determining that the difference is less than the predetermined tolerance, undock from the inventory holder; and
in response to determining that the difference is greater than the predetermined tolerance:
move to a second point based on the location of the inventory holder; and
undock with the inventory holder.

15. The system of claim 14, wherein the mobile drive unit is operable to move to the second point by:
determining an adjusted location based, at least in part, on the location of the inventory holder; and
moving the inventory holder to the adjusted location.

16. The system of claim 14, wherein the mobile drive unit is operable to determine the location of the inventory holder while docked with the inventory holder by:
determining a location of the mobile drive unit; and
determining a position of at least part of the inventory holder relative to the location of the mobile drive unit.

17. The system of claim 16, wherein the mobile drive unit is operable to determine the location of the mobile drive unit by:
detecting a fixed object; and
determining the location of the mobile drive unit based on the fixed object.

18. The system of claim 14, wherein the mobile drive unit is operable to determine the location of the inventory holder while docked with the inventory holder by:
detecting a holder identifier associated with the inventory holder; and
determining the location of the inventory holder based on a position of the holder identifier relative to a location of the mobile drive unit.

19. The system of claim 14, the mobile drive unit further operable to determine that the mobile drive unit has reached the first point based on detecting a fixed object associated with the first point.

20. The system of claim 14, further comprising means for determining the location of the mobile drive unit.

* * * * *